United States Patent [19]
Gostyn et al.

[11] 3,771,928
[45] Nov. 13, 1973

[54] APPARATUS FOR MOLDING POLYURETHANE ARTICLES

[76] Inventors: Terence M. Gostyn, 35 Broadpath Rd., Don Mills, Ontario; Waldemar Schilke, 15 Queen St., Trenton, Ontario, both of Canada

[22] Filed: June 28, 1971

[21] Appl. No.: 157,578

[52] U.S. Cl. ............... 425/4 R, 425/188, 425/425, 425/442
[51] Int. Cl. ............................................ B29d 27/04
[58] Field of Search ...................... 425/4, 817, 215, 425/442, 425, 188

[56] References Cited
UNITED STATES PATENTS

| | | |
|---|---|---|
| 3,541,645 | 11/1970 | Bunting .................................. 425/4 |
| 3,674,408 | 7/1972 | Baumgartner ...................... 425/4 X |
| 3,220,058 | 11/1965 | Ehrenfreund .................... 425/817 X |
| 1,425,368 | 8/1922 | Clayton ............................... 425/215 |
| 3,602,949 | 9/1971 | Kaut .................................. 425/4 X |

Primary Examiner—H. A. Kilby, Jr.
Attorney—Holman & Stern

[57] ABSTRACT

Polyurethane articles, such as shoe soles, are molded in a plurality of molds mounted on a turntable for rotation from a first station for closing the molds to a second station for dispensing reactants into the molds and around the major portion of a circle to an unloading station. During unloading and loading, the molds are horizontal, and during dispensing and travel to the unloading station the molds are tilted, with the base of each mold at an angle of 30° to 75° from the horizontal.

9 Claims, 13 Drawing Figures

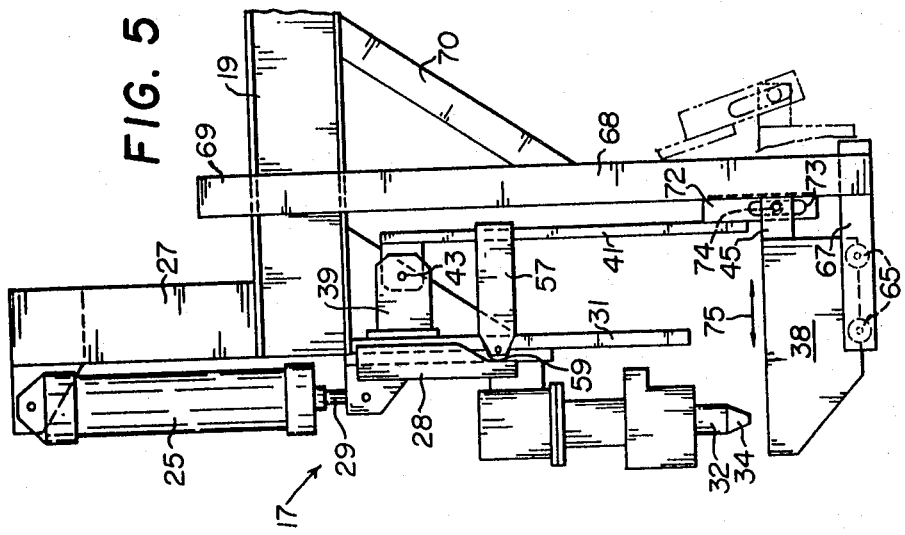
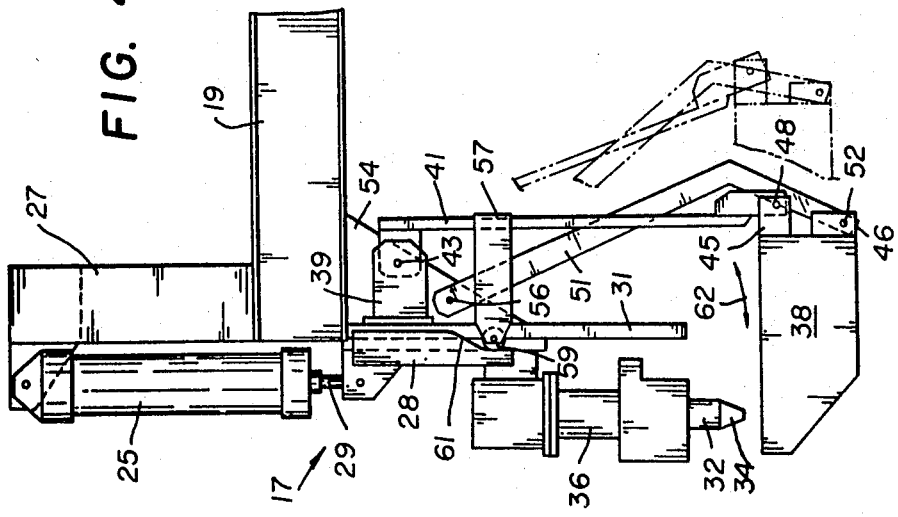

APPARATUS FOR MOLDING POLYURETHANE ARTICLES

This invention relates to an apparatus and method for molding polyurethane articles, and in particular to the molding of polyurethane outer soles directly onto an upper to form shoes.

Shoes have long been manufactured using outer soles formed of plastic or rubber which are bonded directly to the shoe uppers. More recently, shoe soles have been produced using as starting materials liquid or semi-liquid chemical compounds which are mixed and heated in molds to form polyurethane soles. The starting materials are fed into a row of molds through a dispensing nozzle connected to a mixing head, in which the compounds are mixed prior to injection into the mold. The molds are arranged either in an arcuate row, e.g., a circle or a semi-circle, or in an elongated straight row with the molds in side-by-side relationship. Upon completion of feeding, the molds are heated to effect a reaction between the starting materials and, upon completion of the reaction, the mold is opened for removal of the product. The process of loading the molds, heating to effect a reaction and emptying the molds is repeated in a cyclical manner several times to produce a large number of polyurethane soles.

Loading of the molds is effected either by moving the mixing head along the line of molds, when the row of molds defines an arc or a straight line, or by moving the molds by the mixing head when the row of molds defines a circle. However, this process has several disadvantages regardless of which arrangement of molds and dispensing nozzle is used. With the mold in a horizontal position, air is frequently trapped in the mold, whereby the polyurethane being produced by the heat-induced reaction cannot expand to fill the mold, or upon expanding the polyurethane contains air pockets. Moreover, the molds are not always readily accessible, and thus may be difficult to change, service and adjust. Usually, the mixing head is not flushed with solvent or otherwise cleaned between molding opera-tions, i.e., the mixing head retains solidified polyurethane, which contaminates successive moldings. The starting materials are fed into the mold through a dispensing valve, which frequently becomes clogged.

When it is desired to replace a mold, e.g., to change the type or size of the series of soles being produced, the molding apparatus must be stopped. In fact, a major source of trouble with polyurethane molding equipment is the stop, start, pause and restart sequence of operation when changing the stationary molds. Finally, each of the molds used in such a process is usually provided with its own mold opening device for permitting removal of the finished product from the mold, which results in a somewhat bulky machine with an unduly large number of components.

With an elongated straight row of molds arranged in side-by-side relationship, there is a considerable pause between the dispensing of reactants into the last mold and the first mold in the row, since the vehicle carrying the dispensing device must return from the trailing to the leading end of the row.

A recent proposal for overcoming some of the above disadvantages is the use of a permanently tilted series of molds mounted on a turntable for rotation beneath a fixed dispenser, which dispenses a reaction mixture vertically into the molds as they pass successively beneath the dispenser. The advantage of this type of apparatus is that the molds are readily accessible, clogging of the dispensing device is reduced and the formation of air pockets in the polyurethane is eliminated. However, it is difficult to load and unload, i.e., place a lasted upper on and remove the finished product from the mold carrying device. In other words, parts of the apparatus are rendered less accessible by the use of permanently tilted molds.

The object of the present invention is to overcome at least some of the above problems and the disadvantages of existing polyurethane molding apparatus.

Accordingly, the present invention provides a molding apparatus and method for producing a polyurethane sole, wherein a plurality of molds are provided on a turntable, with means for moving the molds serriatim along a generally circular path of travel a portion of which is in the form of a sinuous path for causing the normally tilted base of the mold to assume a horizontal position for removal of the finished product and reloading of the mold. The mold is then tilted and passes beneath a dispensing head for vertically injecting a mixture of reactants capable of forming polyurethane into the mold. Thus, it is seen that each mold is successively loaded, i.e., closed with a lasted shoe upper, in a horizontal position, tilted for receiving a mixture of reactants from a dispensing head and maintained in a tilted condition during movement to an unloading station, i.e., a station for opening the mold and removing the finished product. Immediately prior to reaching the unloading station the mold is dropped to a horizontal position, and is maintained in such horizontal position during unloading and loading.

For the sake of simplicity, any future reference to a tilted mold is intended to mean that the base of the mold which lies in a horizontal plane during unloading and loading of the mold, has assumed a position where it lies in a plane at 30° to 75° from the horizontal.

In accordance with the method of the present invention, a plurality of molds are provided on a circular turntable, and each mold is rotated past a loading station for closing each mold with a lasted shoe upper to a dispenser in the form of a mixing head and dispensing nozzle, which dispenses a heated polyurethane forming reaction mixture into the mold. The heated molds are then rotated successively to an unloading station adjacent the loading station and preceding the latter in the path of travel of the molds for opening the mold and successive removal of each sole bonded to an upper. During rotation from the dispensing device to the unloading station, the reaction mixture is polymerized and expands to form a microcellular product.

By dispensing the reaction mixture downwardly into the molds, valves for closing the mold cavities are eliminated. During passage from the loading station to the dispensing device, the mold is tilted so that its base defines an angle of from approximately 30° to approximately 75° from the horizontal. Loading of the molds with a lasted upper is best achieved with the molds horizontal or nearly horizontal, i.e., with the base of mold disposed in a horizontal or nearly horizontal plane. Tilting of the molds is achieved by means of a guide rail disposed beneath the molds, and after passing the dispensing head and rotating through the major portion of a circle, the molds are returned to the horizontal position for unloading and reloading with lasted uppers.

As mentioned, one advantage of a tilting mold is that no mold closing valve is required. With a stationary horizontal mold, a valve must be provided for closing the mold after charging with the reaction mixture to prevent the escape of such mixture which expands and becomes microcellular as it reacts leaving voids in the shoe sole. With the mold at 30° to 75° from the horizontal, excess material is permitted to escape vertically into an expansion cup through an air vent and the mixture injection port of the mold. The elimination of the valve from the injection port improves the molding process, since valves often clog, requiring frequent cleaning, and leaking valves from horizontal dispensing nozzles contaminate the mold port area. A vertical dispensing head can only leak into the expansion cup, from which the leakage is readily removed with the remainder of the expanded material after gelling.

Since the volume of any mold cavity is partly dependent on the tightness of upper lasting, and since each charge of reactants is volumetrically controlled, the presence of more than one escape port, namely the mold port and an air bleed hole or vent permits relatively free expansion of the polyurethane as it forms. When the upper is loosely lasted, the mold cavity is relatively small and a large amount of polyurethane will escape from the mold cavity. When the upper is tightly lasted, the mold cavity is consequently larger and less polyurethane will escape. However, regardless of whether the upper is tightly or loosely lasted, the soles have a uniform density throughout even though the quantity of polyurethane in each sole may vary. The production of soles of uniform density is ensured, since the polyurethane formed in the mold can freely expand to fill the mold and, if necessary, overflow into the expansion cup surrounding the mold port.

Moreover, by using a mold which is tilted during the charging of the reactants into the mold, air trapping during mold filling is eliminated, large air bubbles are dispersed through the air vent and charging port, and smaller air bubbles are forced against the top of the sole adjacent the lasted upper, where they are less detrimental to the use or appearance of the finished sole. In operating the dispensing device, a mold is moved into position beneath a dispensing head and the head is moved vertically downwardly to position the dispensing nozzle in the mold port inside the expansion cup. The locating of the dispensing head is thus less exacting than with previous apparatus. Some material may escape into the expansion cup located around the mold port. Moreover, the apparatus required to move the dispensing head to the mold is relatively simple.

When dispensing a plurality of chemicals, the usual practice for checking the rate of feed and the proportion of chemicals is to separately weigh the streams of chemicals dispensed per unit of time. With a dispensing head in a normally horizontal position, the usual practice is to tilt the head to the vertical for this purpose. By using a dispensing device, with a head which is normally vertically oriented, the tilting procedure is eliminated.

With the vertical dispensing device, a mixing chamber is located beneath metering ports, and this position helps to reduce the accumulation of reacting compounds in the mixing chamber, which is periodically cleaned with a solvent. Accumulation of reactants in the mixing chamber tends to cause blockage of the metering ports and dispensing nozzles, particularly in horizontal dispensers. In a vertical dispenser, any residual material is forced away from the metering ports by gravity. Solvent purging of the mixing chamber is facilitated, without interfering with the mold carrying device. In order to facilitate cleaning of the mixing chamber, a container is movably mounted beneath the dispensing head for movement out of the path of the head when the head descends toward the mold, and back beneath the head when the latter moves away from the mold. Solvent purging is effected to remove any residual reacting compound from the mixing chamber. The solvent purging is followed by a short blast of air to remove residual solvent. Purging with a solvent can occur after each dispensing action, or as often as necessary.

Generally, multi-component liquid dispensers are capable of a much higher throughput than conventional mold carrying units. Moreover, with such dispensers, continuously accurate dispensing ratios of a multicomponent chemical system can be maintained over a long period of time only by regularly dispensing material. Therefore, it is preferable to use at least two turntables or other mold conveyors, with a dispensing head mounted on a swingable boom between the conveyors, so that one dispensing head can service more than one series of molds. Thus, one conveyor can be stopped for servicing or mold changing, without interrupting production of the soles. In this manner, the dispensing head is in more or less constant use.

In normal operation, with one series of molds, only the dispensing head is moved to locate with the mold, and the major part of the dispensing device remains stationary, with the molds moving to a fixed dispensing station. The elimination of dispensing movement of the entire dispensing device promotes stability of the metering system. Moreover, with previous apparatus, quite often entire dispensing units were moved relative to the mold. In the apparatus of the present invention, the dispensing head is moved only during a dispensing operation.

The method and apparatus of the present invention will now be described in greater detail with reference to the accompanying drawings, wherein:

FIGS. 4 and 5 are side views of two dispensing devices for use with the apparatus of the present invention;

GENERAL DESCRIPTION OF APPARATUS

With reference to the drawings, and in particular to

Figure 1:
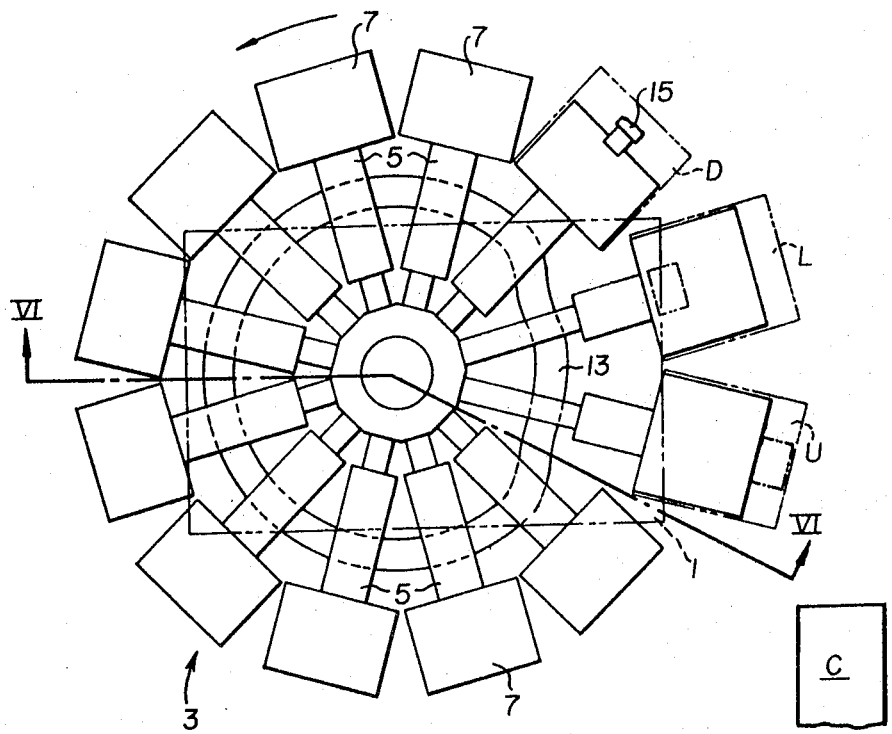
FIG. 1 is a schematic plan view of the turntable constructed in accordance with the present invention.
Figure 3:
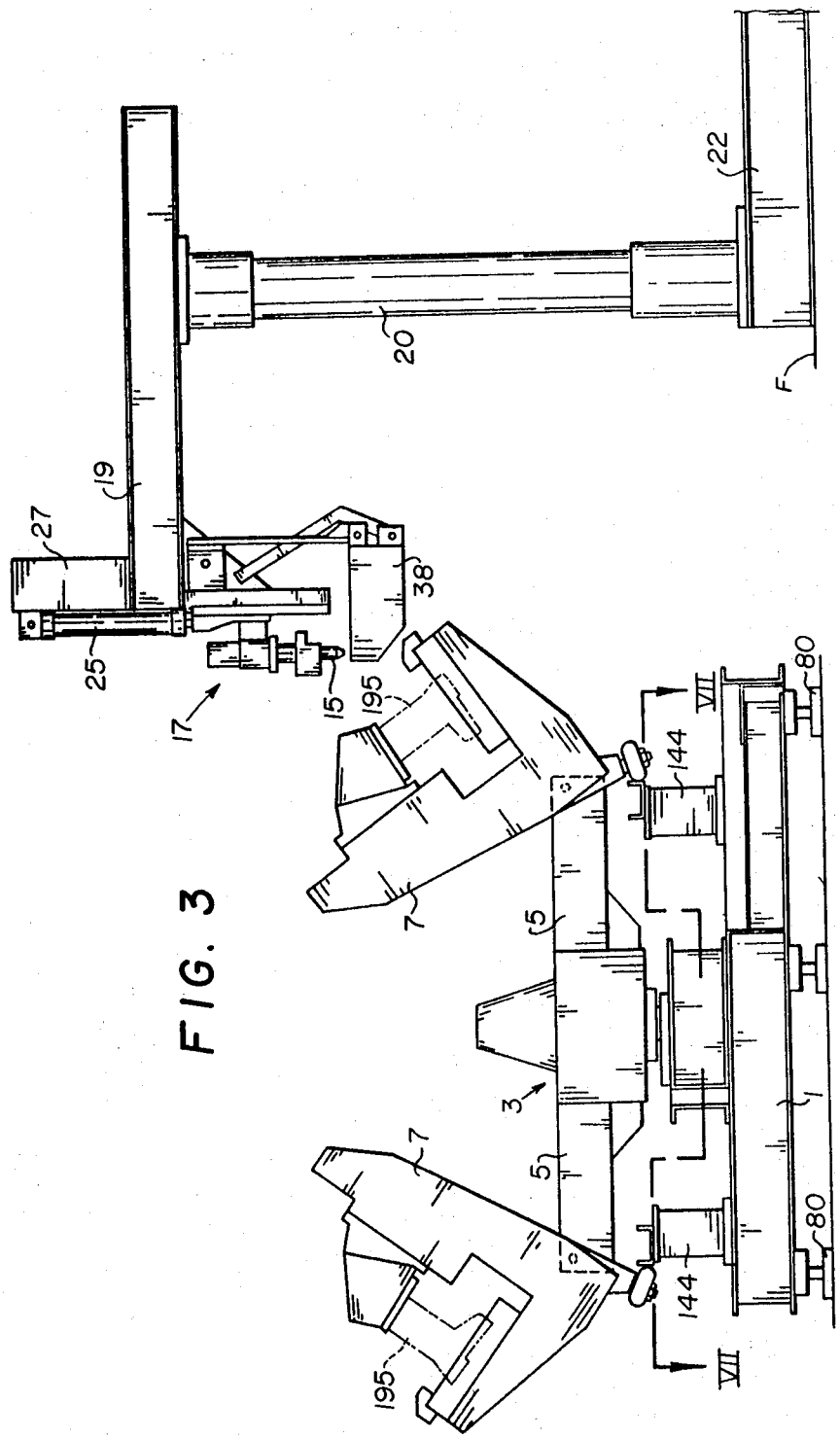
FIG. 3 is a schematic side view of the turntable of FIG. 1, and a dispensing device.

FIGS. 1 and 3, an apparatus for manufacturing shoes or components thereof includes a generally rectangular frame or base 1 rotatably supporting a turntable 3, which includes twelve radially extending arms 5. A mold and lasted upper carrier 7 is pivotally mounted on the outer end of each arm 5 for rotation about a horizontal axis. Each mold and lasted upper carrier 7 is designed to follow a generally circular path of travel defined by a track 13 mounted on the base 1.

During rotation, the mold and lasted upper carrier 7 are successively positioned beneath a dispensing head 15 of a dispensing device 17 at a dispensing station D for receiving a mixture of reactants capable of forming polyurethane, rotated stepwise through the major portion of a circle to an unloading station U; and then to a loading station L. The process is continuous, with the molds being successively loaded, charged with a mixture of reactants, and unloaded. Articles unloaded from the turntable 3 are placed on a conveyor C for conveying the articles to a further processing step or for packaging.

Figure 2:
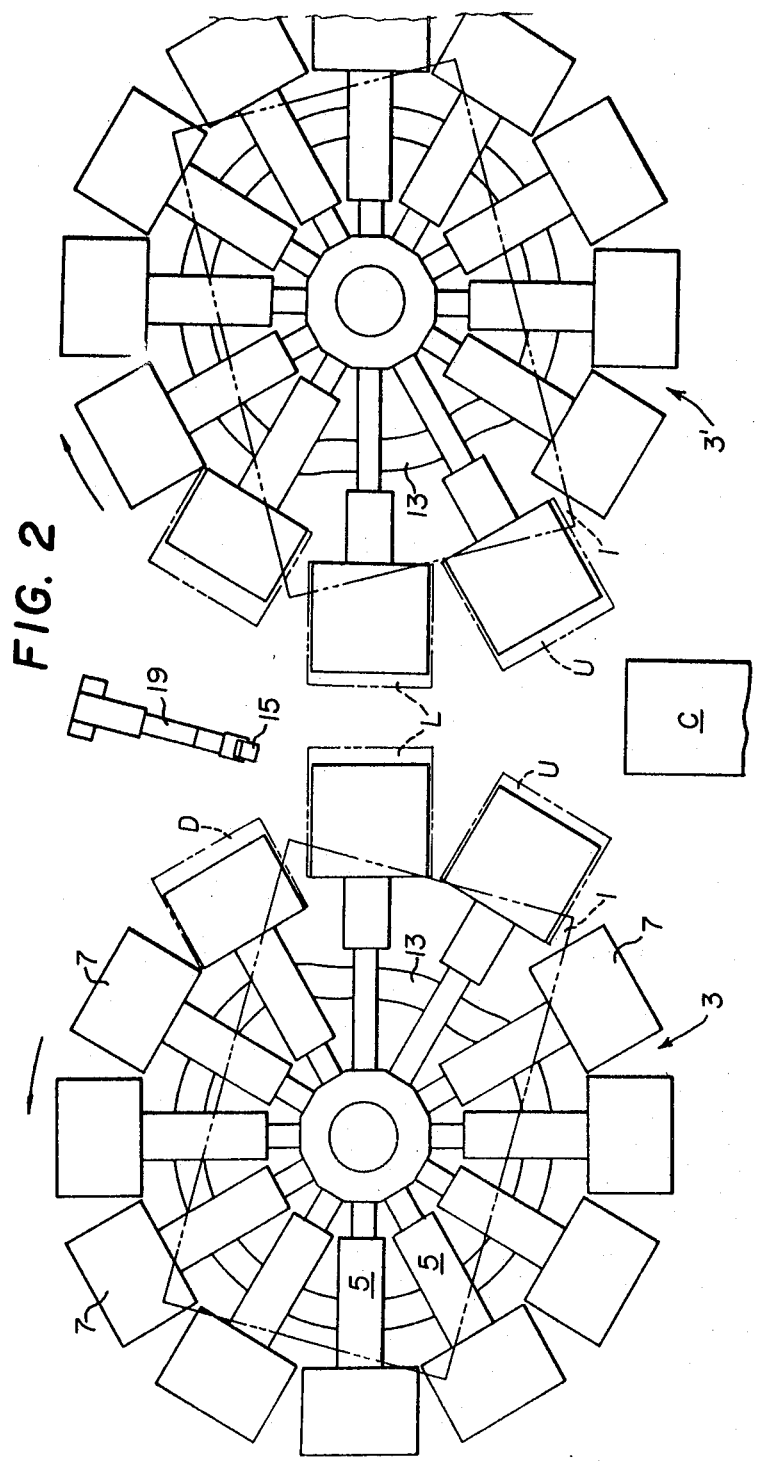
FIG. 2 is a schematic plan view of a pair of turntables constructed in accordance with the present invention.

As described in greater detail hereinafter, two turntables 3 and 3' may be provided in side-by-side relationship for servicing by a single dispensing head 15 (see FIG. 2). The turntables 3 and 3' are mirror images of each other, with similar elements on each turntable.

DISPENSING DEVICE

The dispensing device 17 is supported by a horizontally extending boom 19 mounted on a mast 20, the lower end of which is secured to a base 22, spaced from the frame 1 on a floor F (FIG. 3).

Referring now to FIGS. 4 and 5, each dispensing device 17 includes a pneumatic cylinder 25, one end of which is connected to a vertical support 27 on the outer end of the boom 19. A slide 28 is securely connected to a piston rod 29 extending downwardly from the lower end of the cylinder 25. The slide 28 is slidably mounted on a track 31 extending downwardly from the outer end of the boom 19.

The dispensing device includes casing 32 for a mixing chamber and a dispensing nozzle 34, both of which form the lower end of a mixing head 36 into which the reactants are fed through ducts (not shown) from conventional sources. The mixing head 36 is mounted on the lower end of the slide 28.

DRIP AND SOLVENT FLUSHING PAN

In order to prevent reactants from dripping onto the apparatus between dispensing operations, a container in the form of a pan 38 is provided beneath the nozzle 34 for movement out of the vertical path of travel of the nozzle 34 during a dispensing operation. In order to remove the pan 38 from beneath the dispensing nozzle 34 as the latter descends to the dispensing position two alternative assemblies are provided. The first assembly (see FIG. 4) includes a bracket 39 extending outwardly from the upper rear surface of the track 31. The upper end of a downwardly extending arm 41 is pivotally connected to the bracket 39 for rotation about a horizontal axis defined by a pin 43 interconnecting the bracket 39 and the arm 41. The rear end of the pan 38 is provided with a pair of rearwardly extending plates 45 and 46. One plate 45 is pivotally connected to the lower end of the arm 41 by a pin 48. The other plate 46 is pivotally connected to a second arm 51 by a pin 52. The upper end of the second arm 51 is pivotally connected to a gusset 54 between the boom 19 and the track 31 by a pin 56.

A horizontal bracket 57 is rigidly connected at one end to the first arm 41 and supports a roller 59 for engaging the stepped inner surface 61 of the slide 28. During use, the roller 59 rides on the surface 61 of the slide 28, and causes the arms 41 and 51 to pivot about the horizontal axes defined by pins 43 and 56, respectively, thereby moving the pan 38 through an arc 62 out of the path of travel of the dispensing head 15. When the dispensing head 15 is retracted, i.e., moved vertically upwardly, the pan 38 returns to a position beneath the dispensing nozzle 34, again by movement of the roller 59 along the stepped inner surface 61 of the slide 28 for catching reactants dripping from the nozzle 34.

Referring now to FIG. 5, the alternative form of device for controlling movement of the pan 38 is somewhat similar to the device of FIG. 4. Thus, similar parts have been given the same reference numerals in FIGS. 4 and 5.

In the device of FIG. 5, the pan 38 is provided with rollers 65, movably supporting the pan 38 on a fixed track 67 mounted on the bottom end of a bracket 68, the upper end 69 of which is rigidly connected to the boom 19. A diagonal brace 70 reinforces the connection between the bracket 68 and the boom 19. The lower end of the arm 41 is connected to the bracket 45 by a lost motion joint in the form of a plate 72 with an elongated slot 73 on the lower end of the arm 41 and a roller 74 on the bracket 45 retained in the slotted plate 72. When the roller 59 moves along the stepped inner surface 61 of the slide 28, the pan 38 is moved horizontally rearwardly out of the path of travel of the dispensing head 15 and, when the dispensing head 15 is retracted, the pan 38 moves horizontally back beneath the dispensing head 15. The movement of the pan 38 is in the direction of the arrow 75. As mentioned above, after each or several dispensing operations, solvent is passed through the mixing head from a source (not shown) into the pan 38 to remove residual unreacted or reacted polyurethane from the mixing head.

Although not shown in FIGS. 4 and 5, a third form of device for controlling movement of the pan 38 may be used in the apparatus of the present invention.

The third form of the device for controlling movement of the pan 38 is similar to the device of FIG. 4, but excludes the plate 46 and the second arm 51. A pneumatic cylinder (not shown) is pivotally connected at one end either to the boom 19 between the arm 41 and the mast 20, or to the mast 20 between the middle and top thereof. A piston rod (not shown) projects outwardly from the other end of the pneumatic cylinder, and is pivotally connected at its free end to the pan 38 or to the arm 41 for rotating the pan 38 rearwardly from beneath the nozzle 34 when the mixing head 36 is moved downwardly, when the piston rod is retracted into the pneumatic cylinder, and for returning the pan 38 to beneath the nozzle 34 when the mixing head 36 is moved upwardly.

Thus, it is seen that it is merely necessary that the pan 38 be movably mounted beneath the dispensing head 15 for movement out of the path of travel of the dispensing head 15, when the latter is moved downwardly, and for movement beneath the nozzle 34, when the dispensing head 15 is moved upwardly after a dispensing operation.

The main purpose of the pan 38 is for receiving solvent and reacted or unreacted polyurethane forming compounds during solvent flushing. When flushing the mixing chamber in the casing 32 with solvents, the first step is to pass the solvents through the mixing chamber into the pan 38. The first step is followed by a blast of air, from a source of compressed air (not shown) which removes any residual solvent from the mixing chamber.

FRAME AND TURNTABLE

Figure 6:
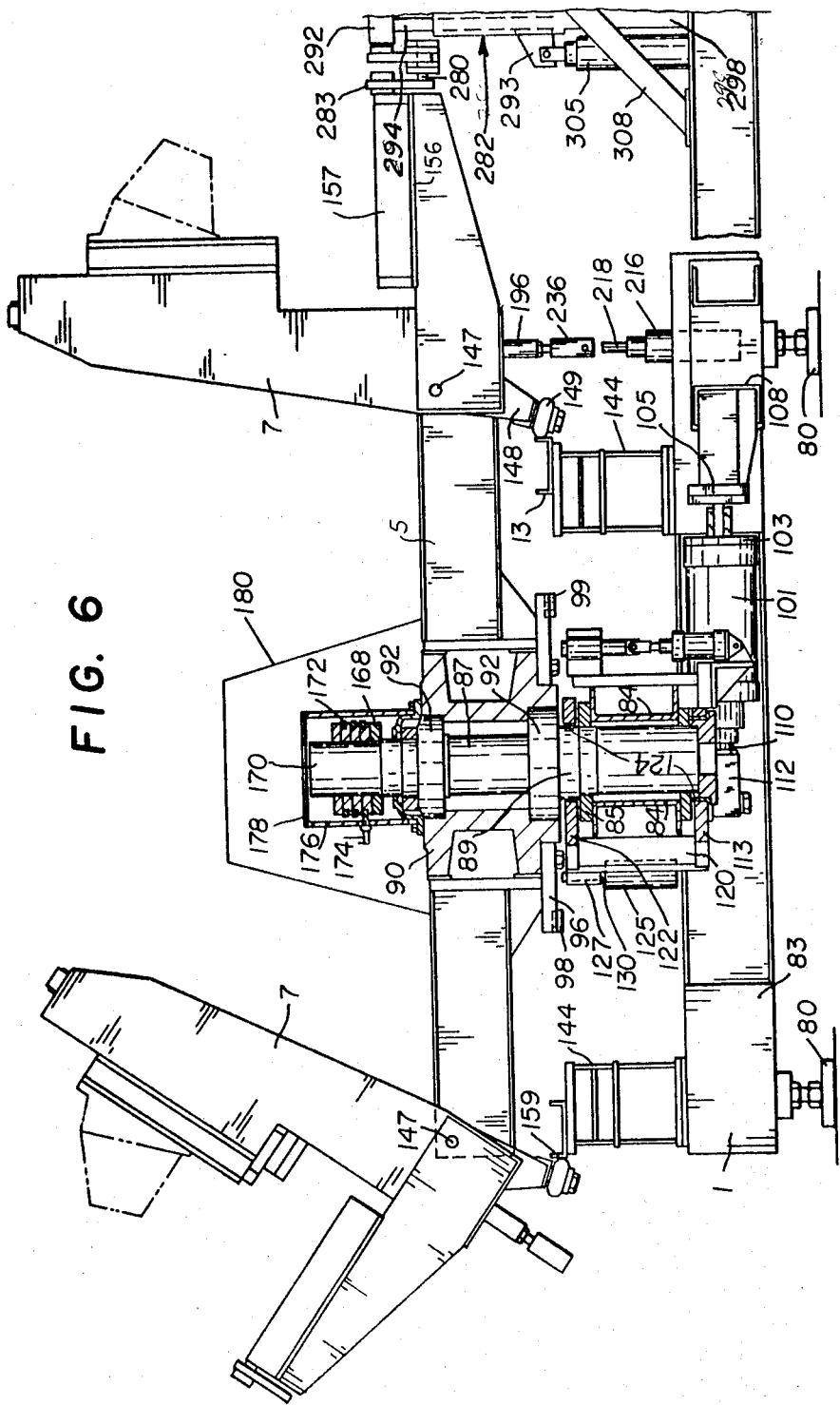
FIG. 6 is a cross-sectional view taken generally along the line VI—VI of FIG. 1.
Figure 7:
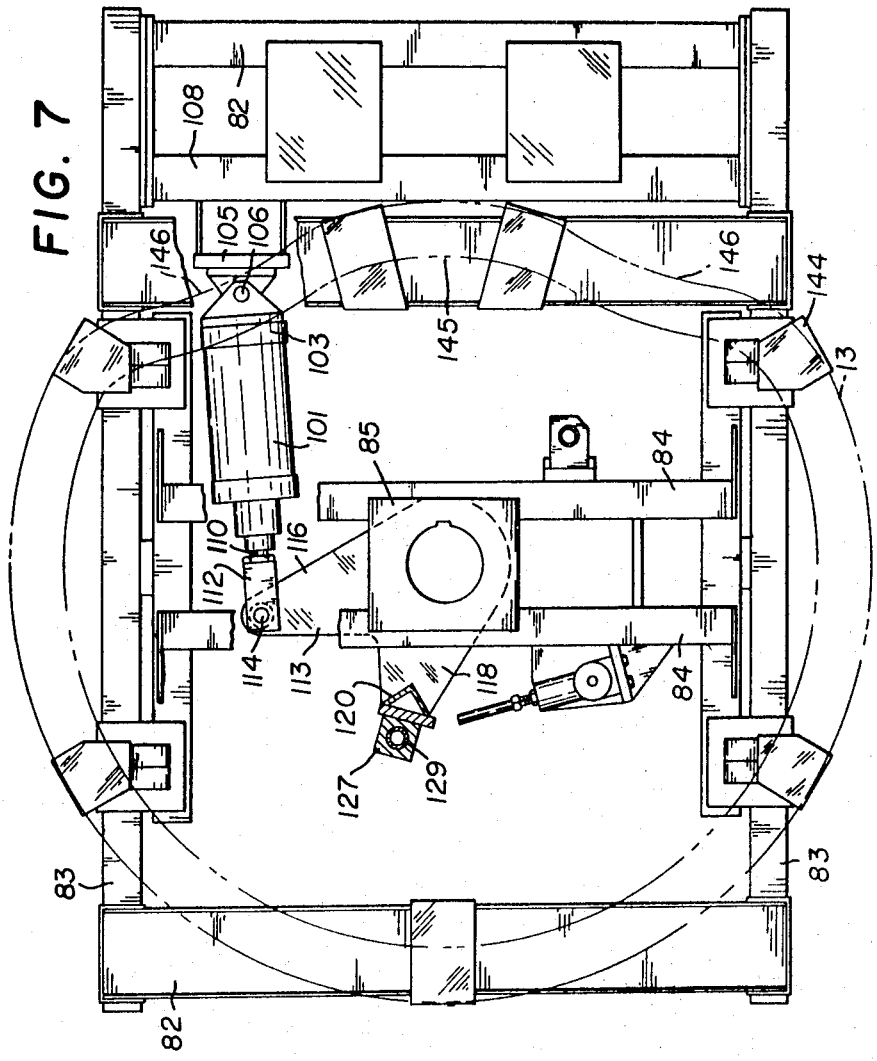
FIG. 7 is a cross-sectional view taken generally along the line VII—VII of FIG. 3.

With reference to FIGS. 6 and 7, the generally rectangular frame 1 is constructed of metal beams, e.g., I-beams, and includes adjustable supporting feet 80. The base 1 is formed with sides 82, ends 83 and transversely extending cross bars 84, which support plates 85 in which a center post 87 is rigidly mounted. The center post 87 is provided with annular outwardly extending shoulders 89 for supporting various elements of the turntable 3.

The turntable 3 includes a hub 90 rotatably mounted on the post 87 by means of bearings 92. The hub 90 supports the twelve radially extending arms 5 in the form of I-beams, or the like. An annular plate 96 is rigidly connected to the base of the hub 90, and is provided with twelve inserts 98, which are spaced equadistant apart along the periphery of the plate 96. Each of the inserts 98 includes a bore 99 for connecting the plate 96 and the hub 90 to a driving mechanism.

The driving mechanism includes a relatively large pneumatic cylinder 101, one end 103 of which is pivotally connected to a bracket 105 by a pin 106 for rotation about the vertical axis of the pin 106. The bracket 105 is rigidly connected to a cross bar 108 of the frame 1. A piston rod 110 extends outwardly from the other end of the cylinder 101 and is provided with a sleeve or cap 112 for connecting the piston rod 110 to a bottom plate 113 of a rotatable turning assembly. The plate 113 is connected to the cap 112 by a bolt 114 and nut 116.

As shown in FIG. 7, the bottom plate 113 is generally V-shaped, with the outer end of one arm 116 of the V being connected to the piston rod 110, and the outer end of the other arm 118 being provided with a V-shaped groove for receiving the bottom end of a vertically extending angle iron 120. The angle iron 120 is welded to the bottom plate 113 and extends upwardly to a top plate 122, which is similar in shape to the bottom plate 113. The plates 113 and 122 are rotatably mounted on the center post 87 by bushings 124. Thus, it is seen that the top plate 122 rotates about the post 87 whenever the bottom plate 113 is rotated by the cylinder 101.

In order to connect the rotatable top and bottom plates, 122 and 113, respectively to the hub 90, a cylinder 125 is provided beneath a sleeve 127 mounted at on a plate 120 near the top of the angle arm 120 and provided with a longitudinally extending aperture 129. A piston rod 130 extends upwardly through the aperture 129 and is engagable with the inserts 98 in the plate 96. In order to lock the hub 90 and arms 5 in one position, a pneumatic cylinder 133 is provided on a bracket 135 rigidly connected to a transverse bar 84 of the frame 1. A piston rod 137 extends upwardly from the cylinder 133 through a sleeve 139 mounted on a vertical arm 140 of the bracket 135. The piston rod 137 is engagable with the inserts 98 in the plate 96.

A shock absorber 141, including a flexible rod 142 for engagement by the side edge of the plate 128 when the turntable is rotated, is mounted on a bracket 143 on a transverse bar 84 of the frame 1 (FIG. 7).

TRACK

Also mounted on the frame 1 is a track 13, which is formed by a plurality of lengths of arcuate sections having a generally U-shaped cross-sectional configuration. The track 13 is mounted on posts 144 extending upwardly from the frame 1. When viewed from above or below, the track defines the major portion of a circle. At its unloading, loading and dispensing side 145, the track 13 is chordal with a pair of concave depressions 146 for permitting the lasted upper and mold carriers 7 to swing from a tilted to a horizontal position. Thus, the side 145 of the track 13 defines a sinuous path and acts as cam for guiding the carriers 7 between a tilted position and a horizontal position, and back to the tilted position.

A lasted upper and mold carrier 7 is pivotally mounted on a pin 147 at the free end of each of the arms 5 of the turntable 3 for rotation about a horizontal axis defined by the pin 147. Each lasted upper and mold carrier 7 includes a downwardly and inwardly extending arm 148, which is provided with a roller 149 at the bottom end thereof. The roller 149 bears against the track 13. The track 13 normally supports the lasted upper and mold carrier 7 in a tilted position (see FIG. 3), with the base 156 of each mold 157 defining an angle to the horizontal of from 30° to 75°. The mold and lasted upper carrier 7 are sufficiently heavy that they constantly bear against the outer edge 159 of the track 13 during passage around the track.

A plurality of annular insulating members 168 are securely mounted on the upper end 170 of the post 87, and provided with current conducting rings 172. The rings 172 are engaged by a current collecting brush 174 fixedly mounted in a side wall 176 of a cover member 178. The cover member 178 is connected to the hub 90 for rotation therewith. Thus, when the cover member 178 is rotated with the turntable, current is passed through the brush 174 to power the apparatus. A frusto-conical dust cover 180 is mounted on the arms 5 above the cover member 178.

LASTED UPPER AND MOLD CARRIER

Figure 8:
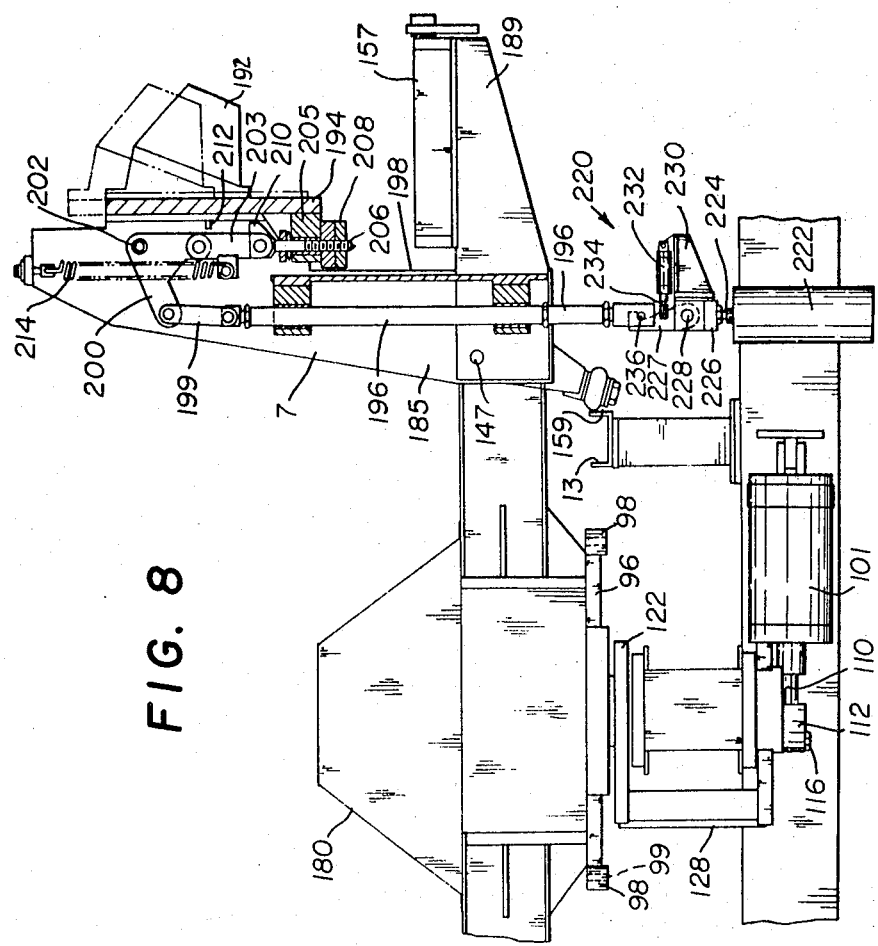
FIG. 8 is a cross-sectional view of a mold and lasted upper holding device.
Figure 10:
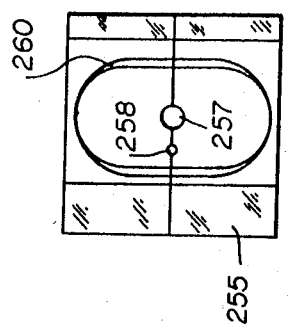
FIG. 10 is a plan view of the expansion cup of FIG. 9.

Referring now to FIG. 8, each lasted upper and mold carrier 7 is in the form of a frame including side walls 185, which are interconnected by the base plate 156 of the mold 157 and the rod 147 extending through the upper end of the arm 148. Each lasted upper and mold carrier 7 is generally L-shaped with the horizontal arm 189 of the L acting as a support for the mold 157 (which is described in greater detail hereinafter). A generally frusto-conical lasted upper supporting arm 192 is mounted on a plate 194 on the vertical arm of the device 7. The plate 194 is movable between an upper position, in which a lasted upper 195 (see FIG. 3) is loaded onto the apparatus, and a lower position, in which the lasted upper 195 is positioned on the mold 157 to close the latter. In order to move the plate 194 and thus the lasted upper arm 192 between the upper and lower positions, a rod 196 is slidably mounted in a bracket 198 in the vertical arm of the frame. The upper end of the rod 196 is connected by a linking rod 199 to a toggle linkage including a triangular plate 200 pivotally connected to the side wall 185 of the frame by a pin 202 and a straight link rod 203 connected to a rearwardly extending flange 205 at the bottom of the plate 194 by a bolt 206. The bolt 206 includes a threaded lower end 207 for receiving knurled nuts 208 for adjusting the length of the toggle linkage. The link rod 203 is provided with a stop 210 for engaging a pin 212 limiting the upward movement of the plate 194. Helical springs 214 (only one shown) lock the plate 194 in the upper and lower positions.

The plate 194 and lasted upper supporting arm 192 are normally in the lower position (shown in solid lines in FIG. 8) during passage along the path of travel defined by the track 13. However, when the lasted upper 195 and a finished sole are being removed from the apparatus, the plate 194 must be moved upwardly. Upward movement of the plate 194 is effected by means of a pneumatic cylinder 216 mounted on the frame 1. A cylinder rod 218 projecting upwardly from the cylinder 216 bears against the bottom end of the rod 196 to move the plate 194 and consequently the finished product upwardly.

In order to move the lasted upper arm 192 downwardly, a hook element 220 is provided at the mold loading station. The hook element 220 includes a pneumatic cylinder 222 mounted in the frame 1, with an upwardly extending piston rod 224. A block 226 is rigidly connected to the free end of the piston rod 224 for rotatably supporting the lower end of a hook 227. The hook 227 is pivotally connected to a pin 228 in the block 226 for rotation about a horizontal axis. A platform 230 extending outwardly from the block 226 carries a pneumatic cylinder 232 having a piston rod 234 the outer end of which is connected to the centre of the hook 227 for rotating the latter into and out of engagement with a horizontally extending pin 236 on the lower end of the rod 196. The hook element 220 is located at the mold loading station.

MOLD

Figure 9:
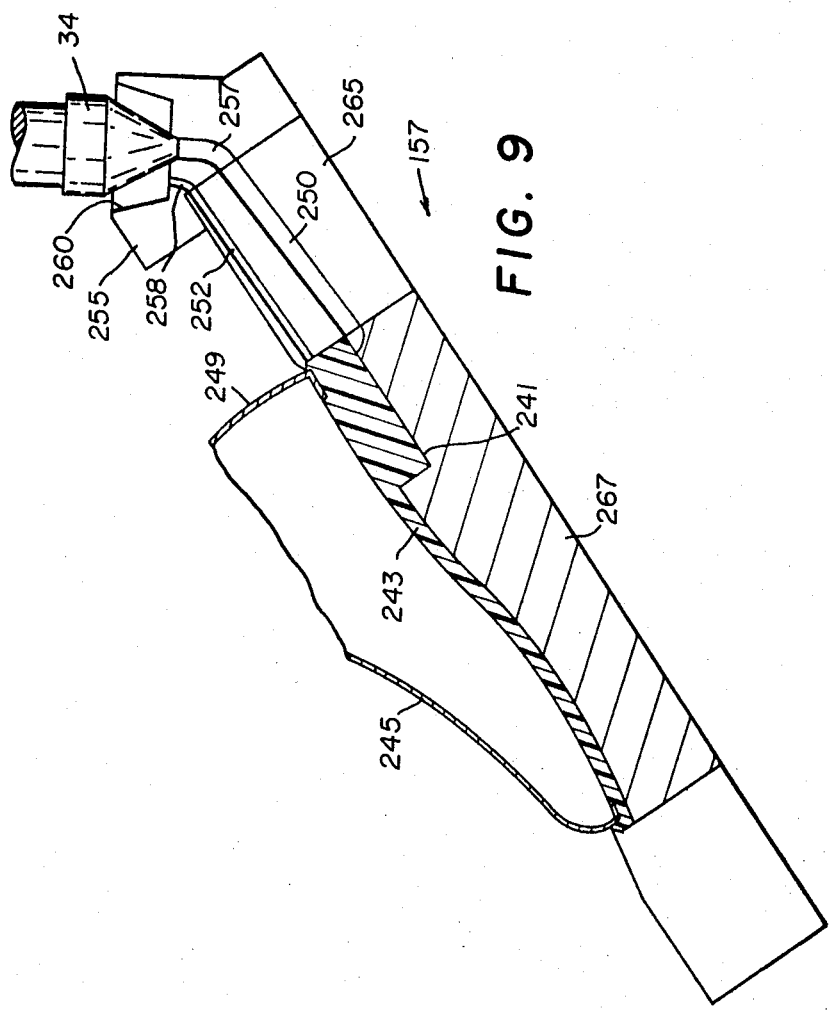
FIG. 9 is a cross-sectional view of a mold and expansion cup taken along the longitudinal centre thereof.

The molds used in the apparatus of the present invention are convention three piece molds which open along their longitudinal centre line. As shown schematically in FIG. 9, each mold 157 includes a mold cavity 241 in which a polyurethane sole 243 of a shoe 245 is formed. The mold cavity 241 is closed by the lasted upper 249, and the mixture of reactants for forming the polyurethane sole 243 are fed into the mold cavity 241 from the dispensing nozzle 34 via a mold port 250. Air is vented from the mold cavity 241, when the reaction mixture expands through the port 250 and an air vent 252.

An expansion cup 255 is provided on one end of the mold 157 for catching any reactants dripping from the dispensing nozzle 34 as the latter is moved away from the mold port 250, for facilitating positioning of the dispensing head in a dispensing position, and for receiving any excess polyurethane escaping through the mold port 250 during expansion of the polyurethane. The expansion cup 255 is provided with holes 257 and 258 aligned with the mold port 250 and air vent 252, respectively, and a generally elliptical recess 260 for receiving the drippings from the dispensing nozzle 34 and expanded polyurethane from the mold cavity 241.

MOLD OPENING DEVICE

Figure 11:
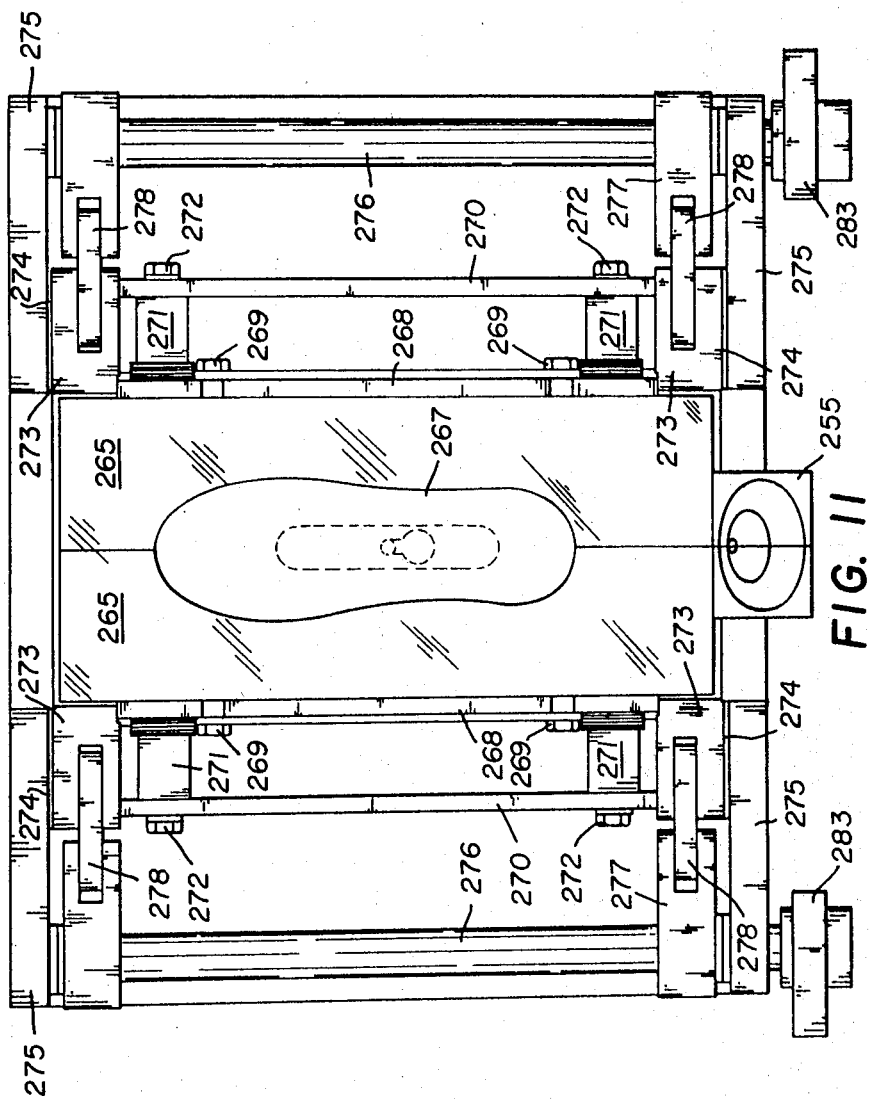
FIG. 11 is a plan view of a mold and expansion cup.
Figure 12:
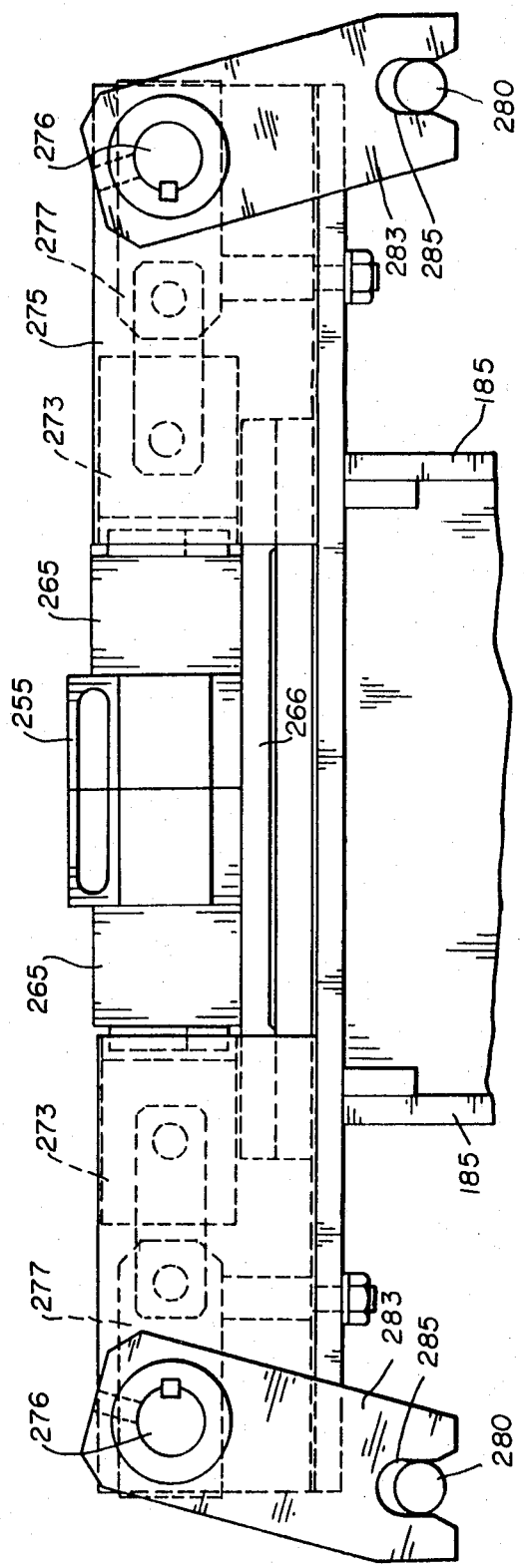
FIG. 12 is an end view of the mold of FIG. 11.

After each mold 157 has been closed by a lasted upper 195 and rotated on the turntable 3 around the major portion of a circle while the reactants react to form an expanded, microcellular polyurethane sole 243, the mold 157 is opened to permit removal of the finished shoe 245. In order to open the mold 157, each mold half 265 (see FIGS. 11 and 12) is slidably mounted on a mold base 266 and is connected to a mold opening device for movement away from a sole mold plate 267. A plate 268 is connected to the outer edge of each mold half 265 by bolts 269 extending through slots in the plate 268. A second plate 270 is connected to the plate 268 by sleeves 271 and bolts 272. Each end of each plate 270 is connected to a slide 273 located at the side corner of each mold half 265. The slides 273 are slidably mounted in tracks formed by an inwardly extending flange 274 on each end wall 275 of the mold support. Each slide 273 is connected to a rotatable shaft 276 by a bracket 277 and pivotal link arms 278. Consequently, rotation of the shaft 276 causes sliding movement of the slides 273, the plates 268 and 270, and the mold halves 265 on the base of the mold 157.

Figure 13:
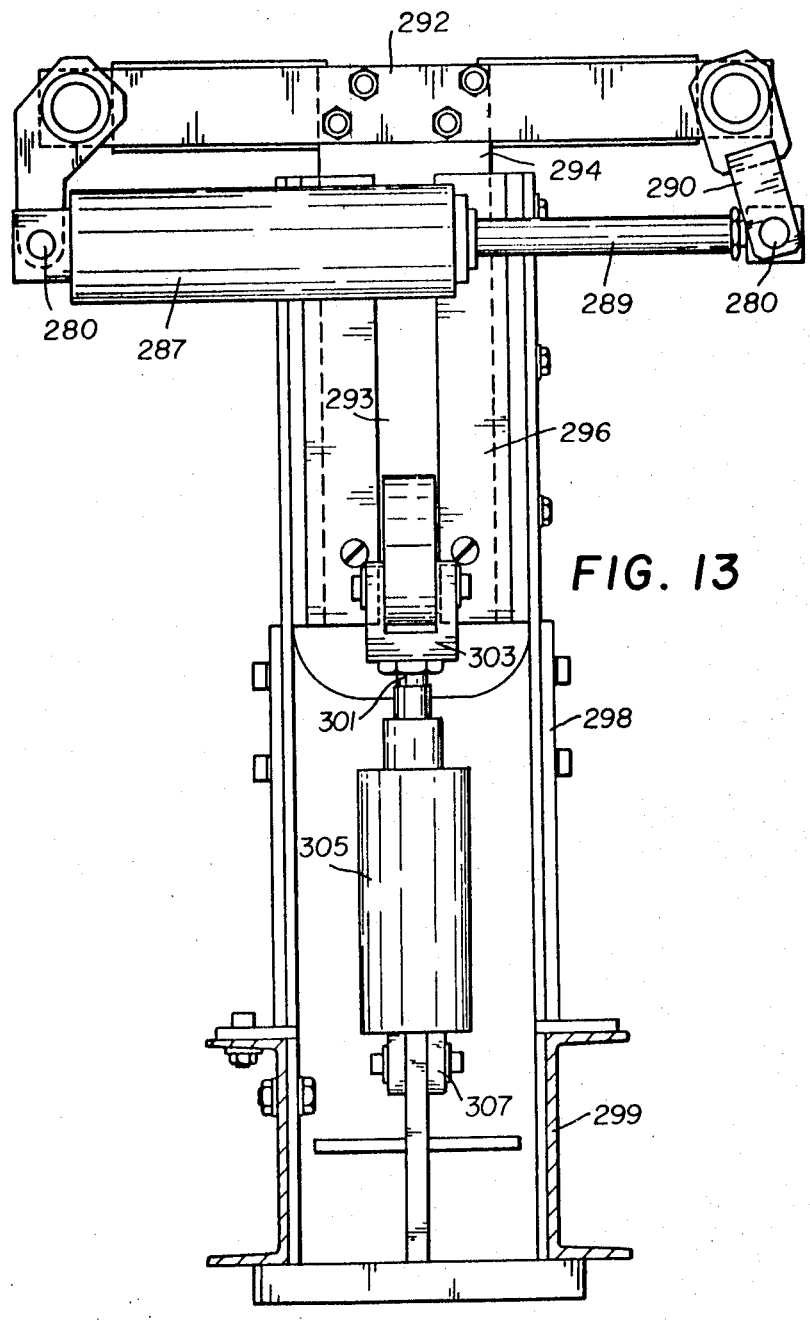
FIG. 13 is an end view of a mold opening device.

In order to rotate the shafts 276, a pair of rods 280 of a mold opening device 282 (see FIGS. 6 and 13) at the unloading station U engage levers 283 rigidly mounted on the outer ends of the shafts 275. Each of the levers 283 is provided with a slot 285 for receiving the rods 280. The rods 280 (FIG. 13) extend inwardly toward the turntable 3 from the outer ends of a pneumatic cylinder 287 and a piston rod 289. One end of each of the rods 280 is mounted in a bracket 290, which is connected to one end of a horizontal top arm 292 of a T-shaped slide 293. A vertical stem 294 of the T-shaped slide 293 is slidably mounted in a track 296 on a standard 298 mounted on one side beam 299 of the frame 1. A piston rod 301 is connected to the lower end of the slide 293 by a bracket 303, the piston rod 301 being slidable in a pneumatic cylinder 305 connected to frame 1 by a bracket 307. A diagonal brace 308 (FIG. 6) reinforces the connection between the standard 298 and the frame 1.

OPERATION

In operation, with all of the molds 157 empty, a first mold is loaded at the loading station L, i.e., the two halves 265 of the mold are brought together, a lasted upper 195 is positioned on the lasted upper holder 192, and the holder 192 is moved to its bottom position so that the lasted upper closes the top of the mold cavity 241. In order to move the lasted upper holder 192 to its bottom position against the top of the mold 157, the pneumatic cylinder 222 is actuated to move the hook element upwardly to a position close to the lower end of the rod 196. The cylinder 232 is then actuated to cause the hook 227 to engage the pin 236. The piston rod 224 is then retracted into the cylinder 222 to draw the rod 196 downwardly thereby moving the plate 194 and lasted upper holder 192 downwardly. Downward movement of the rod 196 is transmitted to the plate 194 by the linkage (described hereinbefore) located in the vertical arm of the lasted upper and mold carrier 7.

The first mold 157 is then rotated to beneath the dispensing head 15, and the dispensing nozzle 34 is moved downwardly into the outer end of the mold port 250, i.e., into the expansion cup 255. As mentioned hereinbefore, during downward movement of the dispensing head 15, the pan 38 is moved from beneath the dispensing head 15 to permit insertion of the nozzle 34 into the expansion cup 255. A mixture of reactants is then charged into the mold cavity 241, and the dispensing nozzle 34 is removed upwardly from the expansion cup 255 permitting the return of the pan 38 to beneath the dispensing head 15 for catching any reactants dripping from the nozzle 34.

Moreover, after several dispensing operations, it is preferable to flush the mixing chamber contained in the casing at 32 with a solvent to discharge any solid or semi-solid polyurethane through the nozzle 34 into the pan 38. The solvent can be removed from the pan 38, purified and recycled to the solvent flushing system (not shown) for re-use.

The reactants in the mold cavity 241 are heated to effect formation of an expanded microcellular polyurethane sole 243, which sets during passage of the mold 157 around the turntable 3. By successively filling 10 molds 157 in the above manner, the subsequent operation of the apparatus can be rendered continuous.

During the dispensing of reactants into the eleventh mold 157, the first filled mold has reached the unloading station U, where the mold 157 is opened, the lasted upper is raised, and the finished shoe 245 is removed. In order to open each mold 157, the cylinder 305 is actuated to move the piston rod 301 (FIG. 13) upwardly causing the slide 293 to rise, whereby the pins 280 are moved into the slots 285 in the levers 283. The cylinder 287 is then actuated to draw the piston rod 289 into the cylinder 287 and thus move the pins 280 towards each other, rotating the shafts 276 and separating the mold halves 265.

The mold 157 is again closed by actuating the cylinder 287 to move the mold halves 265 together, and the turntable is again rotated to move the mold to the loading station L, where a lasted upper 195 is placed on the holder 192, the top of the mold 157 is closed by the lasted upper 195, and the mold 157 is rotated to the dispensing station D for receiving a further charge of reactants.

In order to move the molds 157, one step at a time to the unloading, loading and dispensing stations, the following sequence of steps occurs in the turntable 3. With the piston rod 137 extended into an insert 98 in the plate 96, i.e., with the turntable locked to the frame 1, and the piston rods 110 and 130 retracted, the first step is to extend the rod 130 into an aligned insert 98 in the plate 96 by actuating the cylinder 125, whereupon the piston rod 137 is retracted and the cylinder 101 is actuated to extend the piston rod 110 to its outer limit. By extending the piston rod 110, the hub 90, and consequently the arms 54 and the lasted upper and mold carriers 7, are caused to rotate about the post 87 by 30° (one-twelfth of a revolution). This action moves all of the molds 157 and lasted uppers 195 one step forward in the direction of travel of the turntable 3, i.e., one mold 157 is moved from beneath the dispensing device 15 at the dispensing station D and is replaced by a fresh mold, another mold is moved from the loading station L to the dispensing station D, a third mold is moved from the unloading station U to the loading station L, and a fourth mold is moved to the unloading station U.

At the completion of each rotation step, the piston rod 137 is extended into an insert 98 to lock the turntable 3, preventing rotation thereof relative to the frame 1, the piston rod 130 is retracted into the cylinder 125, and finally the piston rod 110 returns into the cylinder 101 turning the plates 113 and 122, and the angle iron 120. At the completion of the next dispensing, loading and unloading steps (which are effected simultaneously), the turning mechanism is again actuated to rotate the turntable through one twelfth of a revolution for positioning a succeeding lasted upper and mold carrier 7 at each of dispensing, loading and unloading stations, D, L and U.

It will be appreciated that, while the preferred embodiment of the invention is an apparatus for producing shoes, i.e., polyurethane soles bonded to a lasted upper, the apparatus could also be used for molding any polyurethane article. For molding articles (other than soles bonded to uppers), the lasted upper support 192 could be omitted, replaced with a weighted arm to ensure tilting of the mold, or replaced with a support for a top plate for the mold. The top plate for the mold could be mounted on a downwardly extending arm connected to the plate 192 for facilitating closing of the mold prior to dispensing of the reactants into the mold. Otherwise, the apparatus would be the same as the one described hereinbefore.

While heating means is normally provided in the base 266 of the mold 157, such heating means could be omitted if the reactants were capable of reacting in the absence of heat.

Of course, any form of mold could be used instead of the open-topped mold, particularly if the apparatus is used to mold articles other than soles on shoe uppers. As used in this specification and in the appended claims the expression "liquid reactants" is intended to mean liquid or semi-liquid materials which are capable of flowing like a liquid.

THE EMBODIMENTS OF THE INVENTION IN WHICH AN EXCLUSIVE PROPERTY OR PRIVILEGE IS CLAIMED ARE DEFINED AS FOLLOWS:

1. An apparatus for molding polyurethane articles comprising a plurality of molds for receiving liquid reactants capable of forming microcellular, expanded polyurethane; means for moving said molds along a path of travel; a dispensing device in said path of travel for injecting said liquid reactants vertically into each said mold; means for tilting said mold from a horizontal to a tilted position prior to injection of said reactants into one end of said mold and for returning said mold to a horizontal position following formation of said microcellular, expanded polyurethane in said mold, whereby charging of the mold with said reactants is facilitated.

2. An apparatus according to claim 1, wherein said dispensing device includes a dispensing head, and means for moving said dispensing head vertically toward and away from each said mold.

3. An apparatus according to claim 2, including nozzle means on said dispensing head, and an expansion cup on one end of said mold for receiving said nozzle means when the dispensing head is moved toward said mold.

4. An apparatus according to claim 1, wherein said means for moving said molds along a path of travel includes a frame; a turntable rotatably mounted on said frame for supporting each said mold; and a drive mechanism for rotating said turntable stepwise on said frame.

5. An apparatus according to claim 4, including a mold carrier for each said mold pivotally mounted on said frame for rotation about a horizontal axis; said means for tilting each said mold including track means mounted on said frame beneath each said mold carrier; and roller means on each said mold carrier for running on said track means with said mold in a tilted position, said track means including a cam surface for tilting each said mold successively from a tilted to a horizontal position and for returning each mold to the horizontal.

6. An apparatus according to claim 2, including a pan removably disposed beneath said dispensing head for catching any material dripping from said dispensing head when the head is away from said mold; and means for moving said pan out of the path of travel of the dispensing head when the dispensing head is moved toward each said mold.

7. An apparatus according to claim 6, including slide means supporting said dispensing head; a cam surface on said slide means; an arm pivotally mounted on said slide means for supporting said pan; and roller means on said arm for engaging said cam surface to move said arm and pan out of the path of travel of said dispensing head when the dispensing head is moved toward each mold and beneath the dispensing head when the dispensing head is moved away from the mold.

8. An apparatus according to claim 7, including means pivotally connecting said pan to said arm, whereby movement of said dispensing head and slide causes rotation of said pan out of the path of travel of or beneath said dispensing head.

9. An apparatus according to claim 7, including fixed track means for slidably supporting said pan for horizontal movement out of the path of travel or beneath said dispensing head.

* * * * *